(12) United States Patent
Petty (10) Patent No.: US 8,109,094 B2
(45) Date of Patent: Feb. 7, 2012

(54) SYSTEM AND METHOD FOR AQUIFER GEO-COOLING

(75) Inventor: Susan Petty, Shoreline, WA (US)

(73) Assignee: AltaRock Energy Inc., Seattle, WA (US)

( * ) Notice: Subject to any disclaimer, the term of this patent is extended or adjusted under 35 U.S.C. 154(b) by 168 days.

(21) Appl. No.: 12/433,611

(22) Filed: Apr. 30, 2009

(65) Prior Publication Data

US 2009/0272511 A1 Nov. 5, 2009

Related U.S. Application Data

(60) Provisional application No. 61/049,295, filed on Apr. 30, 2008.

(51) Int. Cl.
*F03G 7/00* (2006.01)

(52) U.S. Cl. ...................................... 60/641.2; 60/641.6

(58) Field of Classification Search ........ 60/641.2–641.4, 60/641.6–641.7
See application file for complete search history.

(56) References Cited

U.S. PATENT DOCUMENTS

| | | |
|---|---|---|
| 3,195,630 A | 7/1965 | Fisher |
| 3,390,723 A | 7/1968 | Hower et al. |
| 3,526,097 A | 9/1970 | Nelson |
| 3,942,101 A | 3/1976 | Saye et al. |
| 3,960,736 A | 6/1976 | Free et al. |
| 4,055,399 A | 10/1977 | Parrish |
| 4,126,406 A | 11/1978 | Traylor et al. |
| 4,223,729 A | 9/1980 | Foster |
| 4,357,801 A * | 11/1982 | Wahl, III ...................... 60/641.3 |
| 4,520,666 A | 6/1985 | Coblentz et al. |
| 4,559,818 A | 12/1985 | Tsang et al. |
| 4,573,537 A | 3/1986 | Hirasuna |
| 4,577,679 A * | 3/1986 | Hibshman ...................... 165/45 |
| 4,716,964 A | 1/1988 | Erbstoesser et al. |

(Continued)

FOREIGN PATENT DOCUMENTS

DE    3925337 A1    2/1991

(Continued)

OTHER PUBLICATIONS

Greatly Enhanced Detectability of Geothermal Tracers Through Laser-Induced Fluorescence, Peter E. Rose, et al. Oct. 30, 2002; 10 pages.

(Continued)

*Primary Examiner* — Hoang Nguyen
(74) *Attorney, Agent, or Firm* — Sanjeet K. Dutta; King & Spalding LLP (57) ABSTRACT

A geo-cooling system of specified cooling capacity for cooling a known heat load is disclosed. The system includes a cool water aquifer, a cool water production well and a heated water injection well. The cool water production well is open to the cool water aquifer and in hydrologic communication with a subterranean heat exchange area that provides requisite cooling capacity to a known heat load. The heated water injection well is in hydrologic communication with the subterranean heat exchange area and open to the cool water aquifer at a prescribed distance from the cool water production well. The prescribed distance between the cool water production well and the heated water injection well is at least based on the available size of a subterranean heat exchange area including a portion of the cool water aquifer that hydrologically communicates between the heated water injection well and the cool water production well.

19 Claims, 4 Drawing Sheets

U.S. PATENT DOCUMENTS

| | | | |
|---|---|---|---|
| 4,749,035 A | 6/1988 | Cassity | |
| 4,832,121 A | 5/1989 | Anderson | |
| 4,926,949 A | 5/1990 | Forrest | |
| 4,976,142 A | 12/1990 | Perales | |
| 5,143,155 A | 9/1992 | Ferris et al. | |
| 5,163,321 A | 11/1992 | Perales | |
| 5,165,235 A | 11/1992 | Nitschke | |
| 5,246,860 A | 9/1993 | Hutchins et al. | |
| 5,515,679 A | 5/1996 | Shulman | |
| 5,595,245 A | 1/1997 | Scott, III | |
| 5,651,251 A * | 7/1997 | Hardin | 60/641.2 |
| 5,723,781 A | 3/1998 | Pruett et al. | |
| 5,890,536 A | 4/1999 | Nierode et al. | |
| 5,931,000 A | 8/1999 | Turner et al. | |
| 5,944,446 A | 8/1999 | Hocking | |
| 6,016,191 A | 1/2000 | Ramos et al. | |
| 6,125,934 A | 10/2000 | Lenn et al. | |
| 6,291,404 B2 | 9/2001 | House | |
| 6,543,538 B2 | 4/2003 | Tolman et al. | |
| 6,659,175 B2 | 12/2003 | Malone et al. | |
| 6,758,271 B1 | 7/2004 | Smith | |
| 7,032,662 B2 | 4/2006 | Malone et al. | |
| 7,207,389 B2 | 4/2007 | Foster et al. | |
| 7,265,079 B2 | 9/2007 | Willberg et al. | |
| 7,296,625 B2 | 11/2007 | East, Jr. | |
| 7,299,873 B2 | 11/2007 | Hartman et al. | |
| 7,347,260 B2 | 3/2008 | Ferguson et al. | |
| 7,490,657 B2 * | 2/2009 | Ueyama | 165/45 |
| 7,523,024 B2 | 4/2009 | Endres et al. | |
| 7,565,929 B2 | 7/2009 | Bustos et al. | |
| 7,891,187 B2 * | 2/2011 | Mohr | 60/641.2 |
| 2003/0079877 A1 | 5/2003 | Wellington et al. | |
| 2004/0074642 A1 | 4/2004 | Price-Smith et al. | |
| 2006/0113077 A1 | 6/2006 | Willberg et al. | |
| 2006/0137349 A1 * | 6/2006 | Pflanz | 60/641.2 |
| 2007/0083331 A1 | 4/2007 | Craig et al. | |
| 2007/0223999 A1 | 9/2007 | Curlett | |
| 2007/0272407 A1 | 11/2007 | Lehman et al. | |
| 2008/0026956 A1 | 1/2008 | Shinbach et al. | |
| 2008/0083536 A1 | 4/2008 | Cavender et al. | |
| 2008/0128108 A1 | 6/2008 | Clark | |
| 2008/0210423 A1 | 9/2008 | Boney | |
| 2008/0236823 A1 | 10/2008 | Willberg et al. | |
| 2009/0037112 A1 | 2/2009 | Soliman et al. | |
| 2009/0065253 A1 | 3/2009 | Suarez-Rivera et al. | |

FOREIGN PATENT DOCUMENTS

| | | |
|---|---|---|
| EP | 0338154 A1 | 10/1989 |
| EP | 0357317 A | 3/1990 |
| EP | 0435430 A1 | 7/1991 |
| EP | 1980604 A | 10/2008 |
| GB | 2288694 A | 10/1995 |
| WO | WO 99/05394 A | 2/1999 |
| WO | WO 2004/076815 A | 9/2004 |
| WO | WO 2005/001242 A2 | 1/2005 |
| WO | WO 2006/002325 A2 | 1/2006 |
| WO | WO 2008/064074 | 5/2008 |
| WO | WO 2008/107831 A2 | 9/2008 |
| WO | WO 2008/122114 | 10/2008 |
| WO | WO 2008/156970 | 12/2008 |

OTHER PUBLICATIONS

Kinetics of Fluorescein Decay and its Application As a Geothermal Tracer; Michael Adams and Jon Davis; vol. 20, No. 1/2; pp. 53-66, 1991.

Tester et al, The future of thermal energy: Impact of Enhanced Geothermal Systems (EGS) on the United States in the $21^{st}$ Century; (Retrieved from the Internet, <URL:geothermal.inel.gov/publications/future_or_geothermal_energy.pdf>) 2006, 372 pgs.

PCT/US2010/038420—Search Report, Aug. 18, 2010.

PCT/US2010/036969—Search Report, Jul. 21, 2010.

International Search Report, Sep. 14, 2009.

International Search Report, Aug. 21, 2009.

PCT/US2009/049844—Search Report, Dec. 17, 2009.

PCT/US2009/053304 International Search Report, Mar. 11, 2009.

PCT/US2010/030013—Search Report, Jun. 7, 2010.

PCT/US2009/054536 International Search Report, Nov. 18, 2009.

Biopolymers: overview of several properties and consequences on their applications; K. Van de Velde and P. Kiekens; Department of Textiles, Ghent University, Sep. 11, 2011 pp. 433-442.

Components on High Temperature Plugs: Progress Report on Polymers and Silicates; S. Bauer, D. Galbreath, J. Hamilton and A. Mansure; Geothermal Resources Council Transactions, vol. 28, Aug. 29-Sep. 1, 2004, pp. 145-152.

* cited by examiner

SYSTEM AND METHOD FOR AQUIFER GEO-COOLING

CROSS REFERENCE TO RELATED APPLICATIONS

This application claims priority from U.S. provisional application No. 61/049,295, entitled "SYSTEM AND METHOD FOR AQUIFER GEO-COOLING," filed on Apr. 30, 2008, which is incorporated by reference in its entirety, for all purposes, herein.

FIELD OF TECHNOLOGY

The present application is directed to systems and methods for exchanging heat between a fluid and a subterranean formation.

BACKGROUND

Conventional geothermal heat recovery systems are employed to extract thermal energy from subterranean heated formations through heat exchange with rock using water as the heat exchange medium. In the same way, fluids from the high temperature side of any thermal process can be cooled through heat exchange with cooling water from cool subterranean formations.

Heat exchangers are used in industrial processes to cool heated process fluids before discharging the fluids to the environment. For instance, heat exchangers are used in thermal cycle power plants to decrease the discharge temperature of working fluid exiting a turbine that drives an electrical generator. The efficiency of the thermal cycle increases as the discharge temperature of the working fluid decreases. Water is commonly used in wet cooling cycles because water has a high heat capacity. However, water is not always available and is often allocated for other uses including irrigation, drinking and/or other industrial uses. Water is particularly scarce for cooling uses in projects located in arid areas.

Current wet cooling cycles used in thermal cycle power plants include once through cooling cycles and evaporative cooling cycles. Once-through cooling involves circulating water from a water body or an aquifer through the cooling cycle and then disposing of the heated water into the same or other water body. Evaporative cooling involves circulating cooling water between the cooling cycle and an evaporative cooling tower where the water is cooled.

In once-through cooling cycles, water is not usually consumed and water temperature generally increases less than 10° C. However, large volumes of water are necessary for cooling. Once through cooling cycles require between four and twelve gallons of cool water per minute per kilowatt electricity generated. Heated water is returned to surface water bodies which can adversely impact plant and animal life that is sensitive to minor variations in water temperature.

Evaporative cooling cycles result in approximately 70 to 80 percent water loss on an annual basis, which is equivalent to one to three gallons per minute per kilowatt electricity generated. Recirculation of cooling water through the evaporative cooling tower increases the concentration of dissolved solids and minerals that are common in water and brine produced from geothermal wells. Scale and corrosion inhibitors and other chemicals are required to prevent scale, corrosion and growth of organisms such as algae in the oxygen rich cooling cycle. This water, if disposed of to surface water bodies, can cause environmental damage.

Current cooling systems and methods that are used in industrial processes including, but not limited to, flash steam power plants, binary power plants and solar thermal power plants are inefficient, require large volumes of water and are harmful to the environment.

SUMMARY

A geo-cooling system of specified cooling capacity for cooling a known heat load is disclosed. The system includes a cool water aquifer, a cool water production well and a heated water injection well. The cool water production well is open to the cool water aquifer and in hydrologic communication with a subterranean heat exchange area that provides requisite cooling capacity to a known heat load. The heated water injection well is in hydrologic communication with the subterranean heat exchange area and open to the cool water aquifer at a prescribed distance from the cool water production well. The prescribed distance between the cool water production well and the heated water injection well is at least based on the available size of a subterranean heat exchange area including a portion of the cool water aquifer that hydrologically communicates between the heated water injection well and the cool water production well.

The foregoing and other objects, features and advantages of the present disclosure will become more readily apparent from the following detailed description and figures of exemplary embodiments as disclosed herein.

DEFINITIONS

The term "aquifer" is defined herein as a formation, group of formations, or part of a formation that contains sufficient saturated permeable material to yield economical quantities of water to wells and springs.

The term "aquifer stimulation" is defined herein as a type of development in semiconsolidated and completely consolidated formations to alter the formation physically to improve its hydraulic properties.

The term "aquitard" is defined herein as a saturated, but poorly permeable bed, formation or group of formations that does not yield water freely to a well or spring. However, an aquitard may transmit appreciable water to or from adjacent aquifers.

The term "confined aquifer" is defined herein as a formation in which the groundwater is isolated from the atmosphere at the point of discharge by impermeable geologic formations; confined groundwater is generally subject to pressure greater than atmospheric.

The term "permeability" is defined herein as the property or capacity of a porous rock, sediment, or soil for transmitting a fluid and a measure of the relative ease of the fluid flow under unequal pressure.

The term "transmissivity" is defined herein as the rate at which water is transmitted through a unit width of an aquifer under a unit hydraulic gradient.

The term "unconfined aquifer" is defined herein as an aquifer wherein the water table is exposed to the atmosphere through openings in the overlaying materials.

The term "well screen" is defined as a filtering device used to keep sediment from entering the well.

BRIEF DESCRIPTION OF THE DRAWINGS

Embodiments of the present application are described, by way of example only, with reference to the attached Figures, wherein.

DETAILED DESCRIPTION

It will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, methods, procedures and components have not been described in detail so as not to obscure the embodiments described herein.

Figure 1:
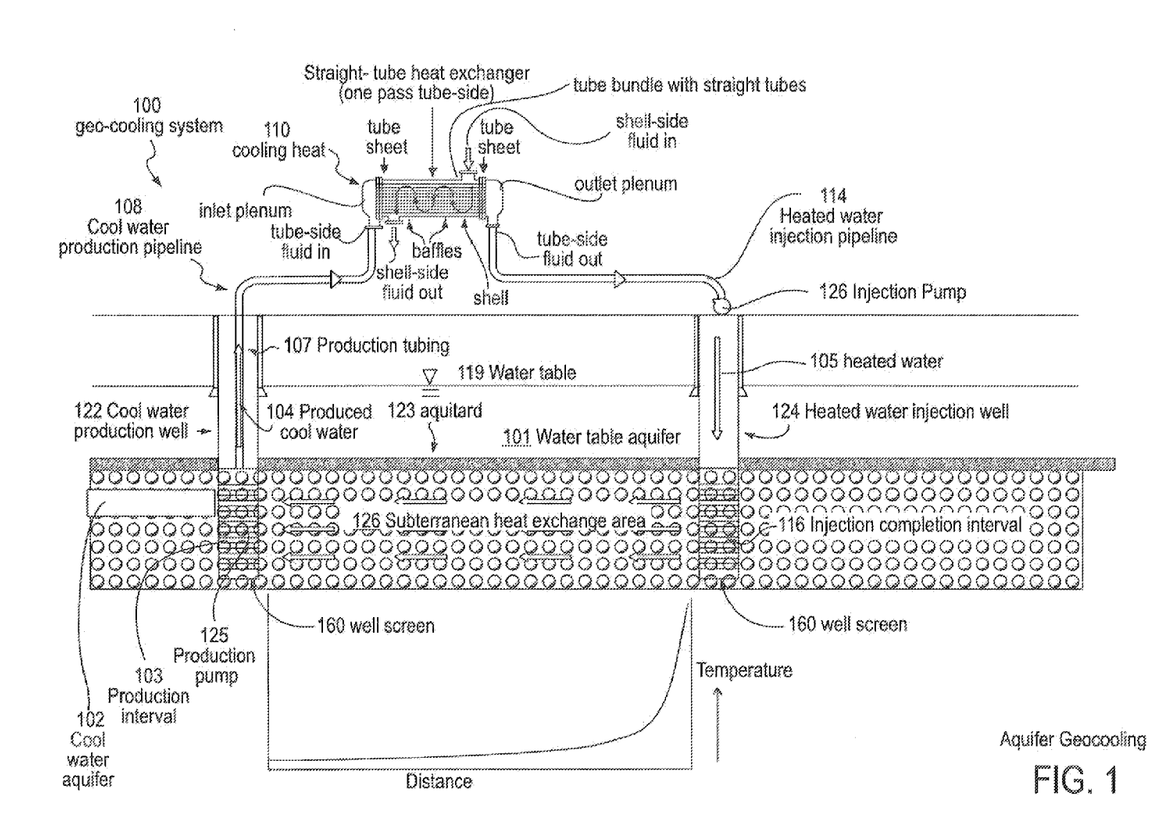
FIG. 1 illustrates an exemplary geo-cooling system for cooling a known heat load according to one embodiment.

FIG. 1 illustrates an exemplary geo-cooling system 100 for cooling a known heat load according to one embodiment. The heat load may be generated by any industrial process including, but not limited to, a flash steam power plant, a binary power plant, a solar thermal power plant, a coal fire power plant and/or any other industrial process known in the art for generating a heat load. The geo-cooling system 100 includes a cool water aquifer 102, a cool water production well 122 and a heated water injection well 124. The cool water aquifer 102 may be confined by an aquitard 123 below the water table 119. A water table aquifer 101 may exist above the aquitard 123. The cool water aquifer 100 may also be an unconfined aquifer. The cool water production well 122 is drilled to a depth sufficient to penetrate the cool water aquifer 102. The heated water injection well 124 is drilled a predetermined distance (d) from the cool water production well 122 and to a depth sufficient to penetrate the cool water aquifer 102. A well screen 160 may be provided at the bottom of the cool water production well 122 and/or the heated water injection well 124 to prevent sediment from entering the wells 122, 124.

Cool water 104 enters the cool water production well 122 through a slotted or perforated production interval 103. A downhole pump 125 may be provided within the cool water production well 122 to pump or circulate cool water 104 up the production tubing 107 and production piping 108 and into a cooling heat exchanger 110 for cooling and/or condensing a known heat load. The heat load may be a working fluid used in any industrial process including, but not limited to, a flash steam power plant, a binary power plant, a solar thermal power plant or a coal fire power plant. Heated water 105 is discharged from the cooling heat exchanger 110 and into heated water injection piping 114.

Heated water 105 may be injected or pumped through the heated water injection piping 114 and into the heated water injection well 124 with an injection pump 126. Heated water 105 enters the cool water aquifer 102 through a slotted or perforated completion interval 116. The heated water 105 follows a tortuous fluid path that defines a subterranean heat exchange area 126 wherein heat from the heated water 105 is transferred to the adjacent matrix of rock in the cool water aquifer 102 without a significant increase in the overall temperature of water in the cool water aquifer 102.

The adjacent rock matrix, wherein heated water 105 is cooled, may be a porous rock matrix, a naturally fractured rock matrix or a rock matrix fractured by aquifer stimulation. The subterranean heat exchange area 126 includes a portion of the cool water aquifer 102 that hydrologically communicates between the heated water injection well 124 and the cool water production well 122. The temperature gradient across the subterranean heat exchange area 126 is substantially constant except proximate the injection completion interval 116 where the injection of heated water 105 causes the temperature to rise. Heated water 105 is cooled in the subterranean heat exchange area 126 and is re-circulated through the cool water production well 122 and into the cooling heat exchanger 110 to cool the heat load.

The prescribed distance (d) between the cool water production well 122 and the heated water injection well 124 is based at least on the heat absorption characteristics of the cool water aquifer 102 including the thermal conductivity of cool water 104, the heat capacity of the rock matrix and the available size of the subterranean heat exchange area 126 in the cool water aquifer 102. Preferably, the prescribed distance (d) between the cool water production well 122 and the heated water injection well 124 is selected to maintain a constant temperature of water proximate the cool water production well 122 over the economic life of the industrial process. In cool water aquifers 102 having a porous rock matrix the prescribed distance (d) between cool water production well 122 and the heated water injection well 124 is governed by the following conservation of energy equations:

$$(1-\phi)(\rho C_p)_s \frac{\partial T}{\partial t} = (1-\phi)\nabla \cdot (K_s \nabla T) + (1-\phi)q_s \quad (1)$$

$$\phi(\rho C_p)_l \frac{\partial T}{\partial t} + (\rho C_p)_l (V_l \cdot \nabla)T = \phi \nabla \cdot (K_l \nabla T) + \phi q_l \quad (2)$$

$\phi$ is the porosity of the rock matrix, $(\rho C_p)_s$ is the thermal capacity of the rock matrix, T is the temperature of the rock matrix, K is the thermal conductance of the rock matrix and $q_s$ is the thermal source intensity of the rock matrix within the cool water aquifer 102. $(\rho C_p)_l$ is the thermal capacity of the liquid, $K_l$ is the thermal conductance of the liquid, $V_l$ is the volume of liquid, $q_l$ is the thermal source intensity of the liquid within the cool water aquifer 102 and t is time. The combination of Equations (1) and (2) yields Equation (3).

$$(\rho C_p)_t \frac{\partial T}{\partial t} + (\rho C_p)_l (V_l \cdot \nabla)T = \nabla \cdot (K_t \cdot \nabla T) + q_t \quad (3)$$

$(\rho C_p)_t$ is the total thermal capacity of the cool water aquifer 102, $K_t$ is the total thermal conductance of the cool water aquifer 102 and $q_t$ is the total thermal source intensity of the cool water aquifer 102. By assuming radial flow and a heat flux $$\frac{\partial T}{\partial t}$$

that is constant with time an analytical solution to Equation (3) takes the form of Equation (4).

$$q_T(a, t) = 4\pi K_R r(T_R - T_F) \left\{ \frac{\mathrm{erfc}\frac{(r-a)}{2(\kappa t)^{\frac{1}{2}}} - \exp\left[\frac{(r-a)}{a} + \frac{\kappa t}{a^2}\right]}{\mathrm{erfc}\left[\frac{(r-a)}{(2\kappa t)^{\frac{1}{2}}} + \frac{(\kappa t)^{\frac{1}{2}}}{a}\right]} \right\}^{-1} \quad (4)$$

$K_R$ is the thermal conductance of the rock matrix, a is the depth within the cool water aquifer, r is the radial distance from the wall of subterranean well 100, t is time, $T_R$ is the initial temperature of the rock matrix at a depth a in the cool water aquifer 102, $T_F$ is the final temperature of the rock matrix at a depth a in the cool water aquifer 102, and κ is the thermal diffusivity of the rock matrix in the cool water aquifer 102. Using the simplified conservation of energy Equation (4) the distance (d) between the cool water production well 122 and the heated water injection well 124 can be calculated in order to maintain a substantially constant temperature of the cool water aquifer 102 throughout the economic life of the industrial process.

Figure 2:
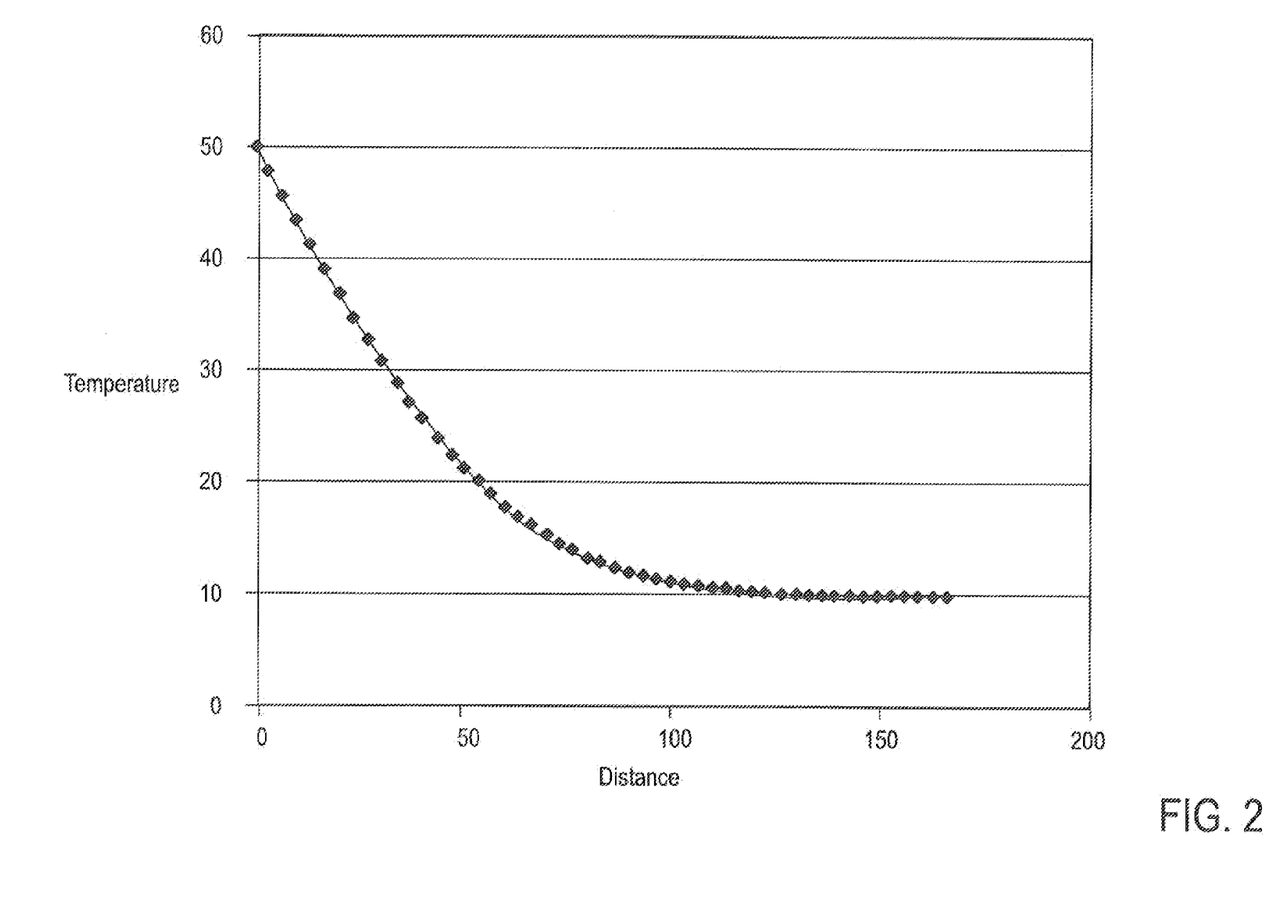
FIG. 2 illustrates the temperature along a distance (d) between a cool water production well and a heated water injection well in an exemplary geo-cooling system.

FIG. 2 illustrates the temperature along a distance (d) in a subterranean heat exchange area 126 between a cool water production well 122 and a heated water injection well 124 in an exemplary geo-cooling system 100. A cool water aquifer 100 that has an initial temperature of 10° C. and temperature of 50° C. proximate the heated water injection well 124 must have a prescribed distance (d) of 150 meters between the cool water production well 122 and the heated water injection well 124 in order to maintain a constant temperature proximate the cool water production well 122 for at least a 30 year period of an industrial process that generates a known heat load.

In accordance with the example embodiment illustrated in FIG. 1, the geo-cooling system 100 may be a closed-loop system wherein water is brought to the surface from the cool water aquifer 102, used to cool a known heat load, re-injected back into the cool water aquifer 102 and re-circulated through the system 100 without being exposed to the atmosphere. By forming a closed-loop geo-cooling system 100 with the cool water aquifer 102, the consumption, evaporation and loss of water is prevented during cooling operations. In most cases, the groundwater chemistry of cool water aquifers 102 is benign and treatment for scale and corrosion is not necessary. Treatment chemicals including scale or corrosion inhibitors may be cycled through the closed-loop geo-cooling system 100 if the water composition in the cool water aquifer 102 is corrosive or impure. Treatment chemicals including scale or corrosion inhibitors may be injected directly into the cool water aquifer 102 with minimal environmental impact if the water contained in the cool water aquifer 102 is non-potable groundwater. Water may be extracted from the cool water aquifer 102, circulated through the geo-cooling system 100 and injected back into the cool water aquifer 102 by pump, thermal siphon gravity or any other method known in the art for circulating water to and from an aquifer.

While the exemplary geo-cooling system 100 illustrated in FIG. 1 includes a cool water production well 122 and a heated water injection well 124, the geo-cooling system 100 may include a plurality of cool water production wells and a plurality of heated water injection wells spaced at a prescribed distance apart sufficient to prevent heating of the water in the plurality of production wells over the life of the industrial process. The number of production and injection wells is governed in part by the magnitude of the heat load generated by the industrial process, the thermal conductivity of water within the cool water aquifer, the heat capacity of the rock matrix of the cool water aquifer within which the production and injection wells are located, the available size of the subterranean heat exchange area, and the transmissivity of the subterranean heat exchange area.

Figure 3A:
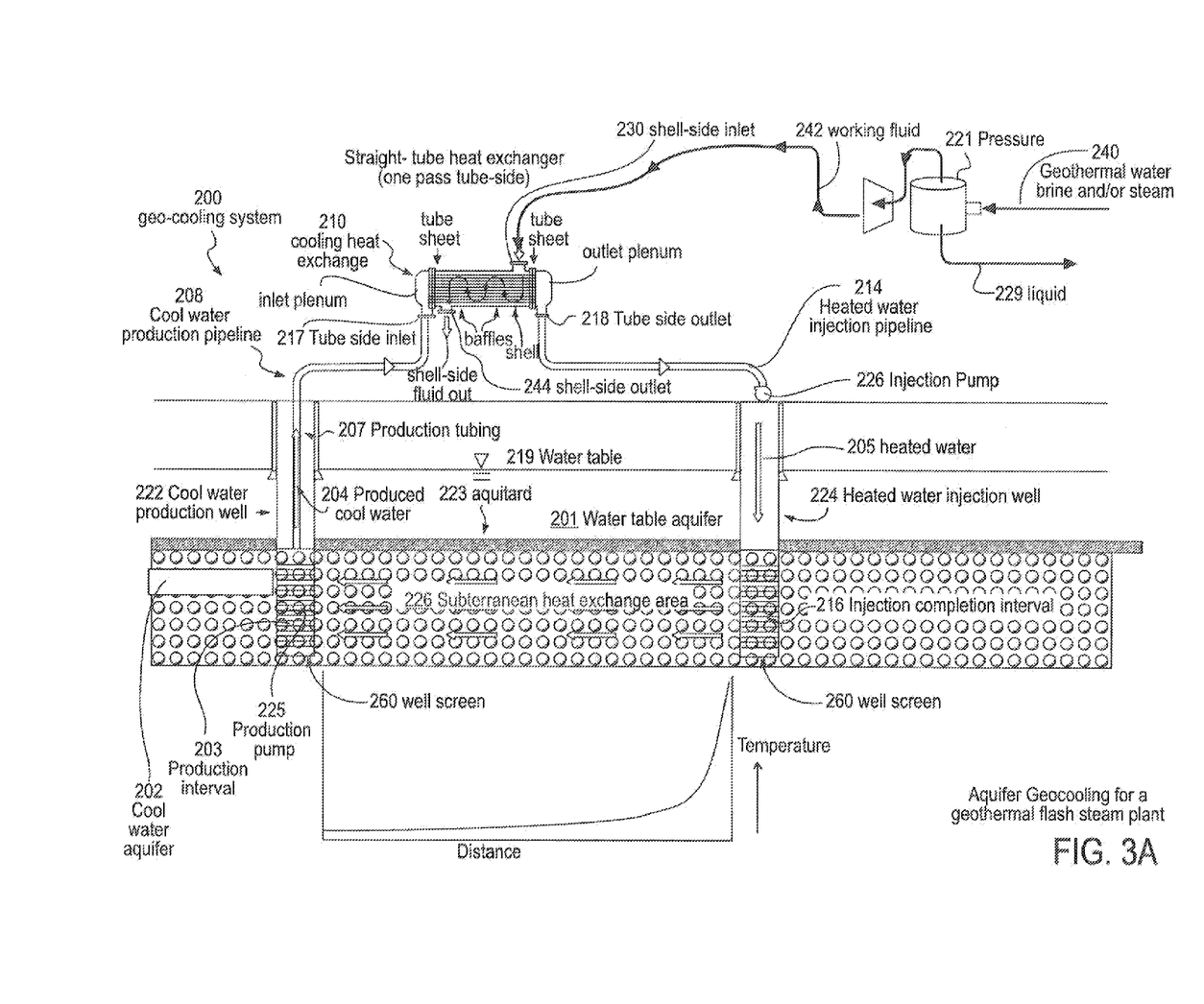
FIG. 3A illustrates an exemplary geo-cooling system for cooling a heat load of a geothermal electricity generating system according to one embodiment.

FIG. 3A illustrates an exemplary geo-cooling system 200 for cooling a heat load of a geothermal electricity generating system according to one embodiment. The geo-cooling system 200 includes a cool water aquifer 202, a cool water production well 222 and a heated water injection well 224. The cool water aquifer 202 may be confined by an aquitard 223 below the water table 219. A water table aquifer 201 may exist above the aquitard 223. The cool water aquifer 200 may also be an unconfined aquifer. The cool water production well 222 is drilled to a depth sufficient to penetrate the cool water aquifer 202. The heated water injection well 224 is drilled a predetermined distance (d) from the cool water production well 222 and to a depth sufficient to penetrate the cool water aquifer 202. A well screen 260 may be provided at the bottom of the cool water production well 222 and/or the heated water injection well 224 to prevent sediment from entering the wells 222, 224. Cool water 204 enters the cool water production well 222 through a slotted or perforated production interval 203. A downhole pump 225 may be provided within the cool water production well 222 to pump or circulate cool water 204 up the production tubing 207 and production piping 208 and into the tube-side inlet 217 of a cooling heat exchanger 210 for cooling and/or condensing a known heat load of a geothermal electricity generating system.

Heated water 205 is discharged from the tube-side outlet 218 of the cooling heat exchanger 210 and into heated water injection piping 214. Heated water 205 may be injected or pumped through the heated water injection piping 214 and into the heated water injection well 224 with an injection pump 226. Heated water 205 enters the cool water aquifer 202 through a slotted or perforated completion interval 216. The heated water 205 follows a tortuous fluid path that defines a subterranean heat exchange area 226 wherein heat from the heated water 205 is transferred to the adjacent rock matrix in the cool water aquifer 202 without a significant increase in the overall temperature of the water in the cool water aquifer 202. The adjacent rock matrix, wherein the heated water 205 is cooled, may be a porous rock matrix a naturally fractured rock matrix or a rock matrix fractured by aquifer stimulation. The subterranean heat exchange area 226 includes a portion of the cool water aquifer 202 that hydrologically communicates between the heated water injection well 224 and the cool water production well 222. The temperature gradient across the subterranean heat exchange area 226 is substantially constant except proximate the injection completion interval 216 where the injection of heated water 205 causes the temperature to rise. Heated water 205 is cooled in the subterranean heat exchange area 226 and is re-circulated through the cool water production well 222 and into the tube-side inlet 217 of the cooling heat exchanger 210 for cooling a known heat load of a geothermal electricity generating system. Water may be extracted from the cool water aquifer 202, circulated through the geocooling system 200 and injected back into the cool water aquifer 202 by a pump, thermal siphon, gravity or any other method known in the art for circulating fluids to and from an aquifer.

In accordance with FIG. 3A, the geothermal electricity generating system may be a flash steam power plant including a heat producing well (not shown) drilled in a geothermal formation (not shown), a pressure separator 221 and a turbine 228. Geothermal brine, water and/or steam 240 may be produced from the heat producing well and separated into liquid 229 and vapor components in the pressure separator 221. The liquid component 229 of the geothermal brine, water and/or steam 240 may be re-injected into the heat producing well or circulated to a second stage flash. The vapor component of the geothermal brine, water and/or steam 240 may be used as the working fluid 242 of a turbine 228 to generate electricity in the flash steam power plant.

The working fluid 242 discharged from the turbine 228 enters the shell-side inlet 230 of the cooling heat exchanger 210 where it is cooled and/or condensed by cool water 204 from the aquifer 202 entering the tube-side inlet 217 of the cooling heat exchanger 210. The cooled and/or condensed working fluid 242 is discharged from the shell-side outlet 244 of the cooling heat exchanger 210 and may be re-injected for heating into the geothermal formation through an injection well. The working fluid 223 may then be produced from the heat producing well and re-circulated through the flash steam power plant for producing electricity. Water, brine and/or steam 240 may be extracted from the heat producing well and circulated through the flash steam power plant by a pump, thermal siphon, gravity or any other methods known in the art for circulating fluids. The flash steam power plant may be a closed-loop system wherein the geothermal brine, water and/or steam 240 produced from the heat producing well is brought to the surface, separated into liquid and vapor components in the pressure separator 221, used to drive the turbine 228, cooled in the cooling heat exchanger 210, re-injected back into the heat producing well and re-circulated through the flash steam power plant without being exposed to the atmosphere.

The geo-cooling system 200 may derive cooling capacity from any aquifer having a fluid and/or rock temperature lower than temperature of the working fluid exiting the turbine 228. The geo-cooling system 200 may derive cooling capacity from a cool water aquifer 202 such as a confined aquifer, unconfined aquifer, a porous matrix aquifer, a naturally fractured aquifer or an aquifer fractured by aquifer stimulation. During aquifer stimulation, naturally occurring fractures in a fractured aquifer in the geo-cooling system 200 may be artificially developed through stimulation of a low permeability aquitard 223. These fractures may be developed by pumping water under pressure sufficient to relieve the stresses on the rocks in the aquitard 223, thus allowing the rock to shift along plains of weakness and create shear fractures. These fractures may enhance the naturally low permeability of the aquitard 223 or may create permeability in rock which has little to no permeability. Cool water aquifers having substantially constant year round groundwater temperatures between 5° C. and 25° C. are capable of cooling a heat load such as the working fluid 242 exiting the turbine 228 of a flash steam power plant throughout the economic life of the power plant.

The efficiency of the flash steam power plant is in part controlled by the difference between the temperature and pressure of the heated working fluid 242 entering the turbine 228 and the temperature and pressure of the cooled working fluid 242 discharged from the cooling heat exchanger 210. This temperature difference may be governed by the fluid and/or rock temperature of the cool water aquifer 202 from which the cool water 204 is sourced. Cool water aquifers 202 with lower fluid and/or rock temperatures provide greater cooling capacity and geothermal formations with higher fluid and/or rock temperatures provide greater heating capacity for generating electricity. The cooling capacity of the geo-cooling system 200 is also affected by the distance (d) between the heated water injection well 224 and the cool water production well 222. By increasing the distance (d) between the heated water injection well 224 and the cool water production well 222, a larger flow rate of heated water 205 can be returned to the cool water aquifer 202 for cooling without causing a significant increase in the overall temperature of the cool water aquifer 202. To maintain a substantially constant water temperature of the cool water aquifer 202 over the typical 30-year life of a flash steam power plant, the increase in temperature of the cool water 204 passing through the heat exchanger 210 must be minimized. To increase the efficiency of the flash steam power plant, the decrease in temperature of the working fluid 242 passing through the heat exchanger 210 must be maximized. In an example embodiment, the temperature increase of the cool water 204 passing through the subterranean cooling heat exchange area 226 is maintained at about 10° C. or less.

Geothermal electricity generating systems deriving heat from geothermal formations with higher fluid and/or rock temperatures require a larger flow rate of cool water 204 from the cool water aquifer 202 to cool and/or condense the working fluid 242 driving the turbine 228 of the electricity generating system. Geothermal electricity generating systems having higher flow rates of working fluid 242 driving the turbine 228 also require a larger flow rate of cool water 204 from the cool water aquifer 202 to cool and/or condense the working fluid 242. The cooling capacity of the geo-cooling system 200 is related not only to the thermal conductivity of the rock matrix of the cool water aquifer 202 and the porosity of the fluid filled portion of the cool water aquifer 202, but also to the initial temperature of the cooling water aquifer 202.

Figure 3B:
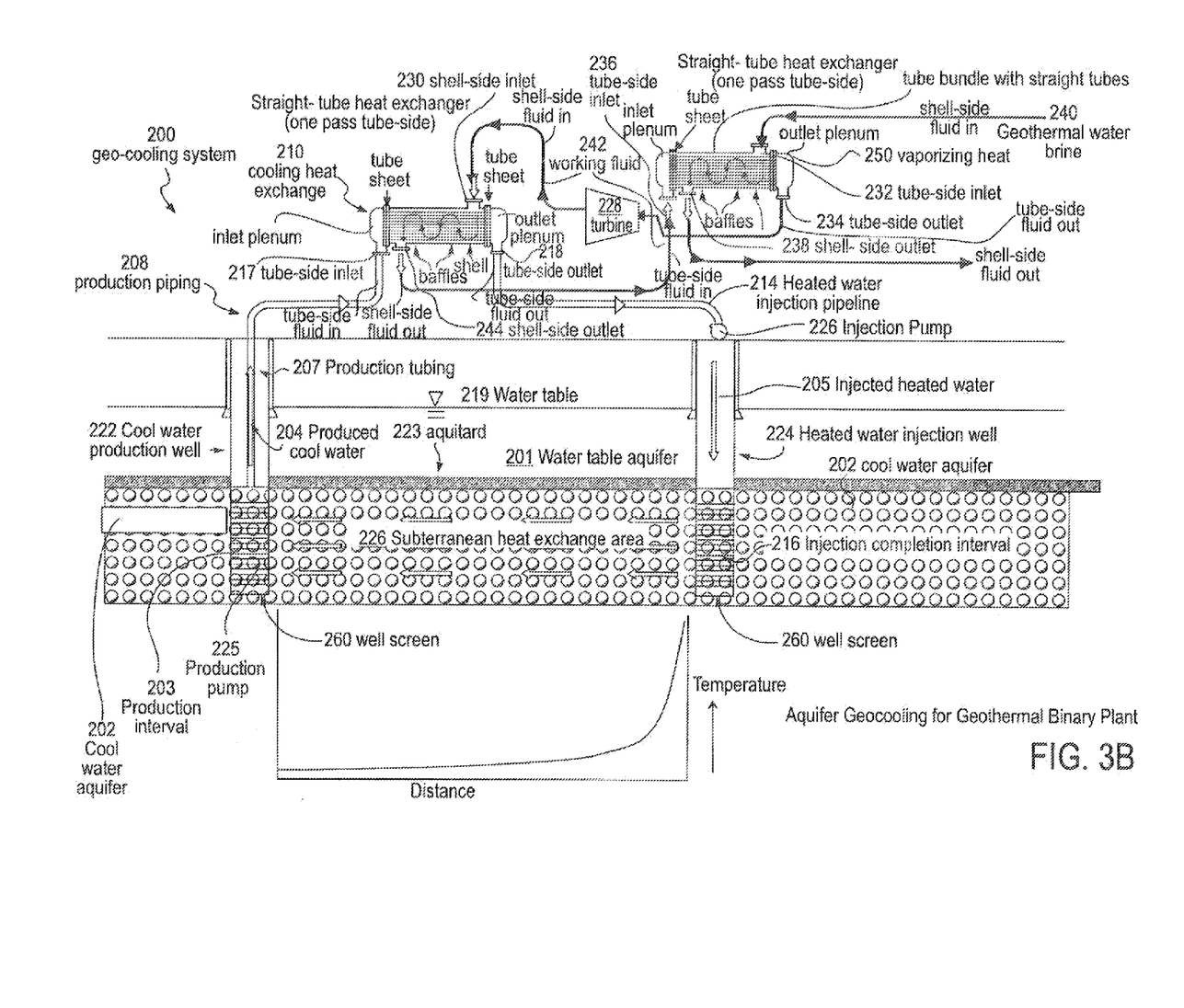
FIG. 3B illustrates an exemplary geo-cooling system in a stimulated, engineered or enhanced aquifer for cooling a heat load of a geothermal electricity generating system according to another embodiment.

FIG. 3B illustrates an exemplary geo-cooling system 200 for cooling a heat load in a geothermal electricity generating system according to another embodiment. The geo-cooling system 200 includes a cool water aquifer 202, a cool water production well 222 and a heated water injection well 224. The cool water aquifer 202 may be confined by an aquitard 223 below the water table 219. A water table aquifer 201 may exist above the aquitard 223. The cool water aquifer may also be an unconfined aquifer. The cool water production well 222 is drilled to a depth sufficient to penetrate the cool water aquifer 202. The heated water injection well 224 is drilled a predetermined distance (d) from the cool water production well 222 and to a depth sufficient to penetrate the cool water aquifer 202. A well screen 260 may be provided at the bottom of the cool water production well 222 and/or the heated water injection well 224 to prevent sediment from entering the wells 222, 224. Cool water 204 enters the cool water production well 222 through a slotted or perforated production interval 203. A downhole pump 225 may be provided within the cool water production well 222 to pump or circulate cool water 204 up the production tubing 207 and production piping 208 and into the tube-side inlet 217 of a cooling heat exchanger 210 for cooling and/or condensing a known heat load of a geothermal electricity generating system.

Heated water 205 is discharged from the tube-side outlet 218 of the cooling heat exchanger 210 and into heated water injection piping 214. Heated water 205 may be injected or pumped through the heated water injection piping 214 and into the heated water injection well 224 with an injection pump 226. Heated water 205 enters the cool water aquifer 202 through a slotted or perforated completion interval 216. The heated water 205 follows a tortuous fluid path that defines a subterranean heat exchange area 226 wherein heat from the heated water 205 is transferred to the adjacent rock matrix in the cool water aquifer 202 without a significant increase in the overall temperature of the water in the cool water aquifer 202. The adjacent rock matrix, wherein the heated water 205 is cooled, may be a porous rock matrix, a naturally fractured rock matrix or a rock matrix fractured by aquifer stimulation.

The subterranean heat exchange area 226 includes a portion of the cool water aquifer 202 that hydrologically communicates between the heated water injection well 224 and the cool water production well 222. The temperature gradient across the subterranean heat exchange area 226 is substantially constant except proximate the injection completion interval 216 where the injection of heated water 205 causes the temperature to rise. Heated water 205 is cooled in the subterranean heat exchange area 226 and is re-circulated through the cool water production well 222 and into the tube-side inlet 217 of the cooling heat exchanger 210 for cooling a known heat load of a geothermal electricity generating system. Water may be extracted from the cool water aquifer 202, circulated through the geocooling system 200 and injected back into the cool water aquifer 202 by a pump, thermal siphon, gravity or any other method known in the art for circulating fluids to and from an aquifer.

In accordance with FIG. 2B, the geothermal electricity generating system may be a binary power plant including a heat producing well (not shown) drilled in a geothermal formation (not shown), a vaporizing heat exchanger 250 and a turbine 228. Geothermal brine, water and/or steam 240 may be produced from the heat producing well and circulated into the shell-side inlet 232 of the vaporizing heat exchanger 250 to vaporize a working fluid 242 entering the tube-side inlet 236 of the vaporizing heat exchanger 250. Preferably the working fluid 242 has a vaporization point lower than the geothermal brine, water and/or steam 222 used to vaporize the working fluid 223. Suitable working fluids for use in binary power plants include, but are not limited to, isobutane or other organic liquids having a boiling point lower than geothermal brine and/or water produced from the heat producing well. The geothermal brine, water and/or steam 240 is discharged from the shell-side outlet 238 of the vaporizing heat exchanger 250, re-injected into the geothermal formation for heating through an injection well, produced from the heat producing well and re-circulated into the vaporizing heat exchanger 250. The vaporized working fluid 242 is discharged from the tube-side outlet 234 of the vaporizing heat exchanger 250 and circulated into a turbine 228 to generate electricity. The production of electricity and the efficiency of the binary power plant increases as the temperature of the working fluid 242 discharged from the turbine 228 decreases.

The working fluid 242 discharged from the turbine 228 enters the shell-side inlet 230 of the cooling heat exchanger 210 where it is cooled and/or condensed by cool water 204 from the aquifer 202 entering the tube-side inlet 217 of the cooling heat exchanger 210. The cooled and/or condensed working fluid 242 is discharged from the shell-side outlet 244 of the cooling heat exchanger 210 and may be re-circulated into the tube-side inlet 236 of the vaporizing heat exchanger 250 where it is vaporized. Water, brine and/or steam 240 may be extracted from the heat producing well and circulated through the binary power plant by a pump, thermal siphon, gravity or any other method known in the art for circulating fluids. The binary power plant may be a closed-loop system wherein the geothermal brine, water and/or steam 222 produced from the heat producing well is brought to the surface, circulated in the vaporizing heat exchanger 250, re-injected back into geothermal formation, produced from the heat producing well and re-circulated through the binary power plant without being exposed to the atmosphere.

The geo-cooling system 200 may derive cooling capacity from any aquifer having a fluid and/or rock temperature lower than temperature of the working fluid exiting the turbine 228 of the binary power plant. The geo-cooling system 200 may derive cooling capacity from a cool water aquifer 202 such as a confined aquifer, unconfined aquifer, a porous matrix aquifer, a naturally fractured aquifer or an aquifer fractured by aquifer stimulation. During aquifer stimulation naturally occurring fractures in a fractured aquifer in the geo-cooling system 200 may be artificially developed through stimulation of a low permeability aquitard 223. These fractures may be developed by pumping water under pressure sufficient to relieve the stresses on the rocks in the aquitard 223, thus allowing the rock to shift along plains of weakness and create shear fractures. These fractures may enhance the naturally low permeability of the aquitard 223 or may create permeability in rock which has little to no permeability. Cool water aquifers having substantially constant year round groundwater temperatures between 5° C. and 25° C. are capable of cooling a heat load such as the working fluid 242 exiting the turbine 228 of a binary power plant throughout the economic life of the power plant.

The efficiency of the binary power plant is in part controlled by the difference between the temperature and pressure of the heated working fluid 242 entering the turbine 228 and the temperature and pressure of the cooled working fluid 242 discharged from the cooling heat exchanger 210. This temperature difference may be governed by the fluid and/or rock temperature of the cool water aquifer 202 from which the cool water 204 is sourced. Cool water aquifers 202 with lower fluid and/or rock temperatures provide greater cooling capacity and geothermal formations with higher fluid and/or rock temperatures provide greater heating capacity for generating electricity. The cooling capacity of the geo-cooling system 200 is also affected by the distance (d) between the heated water injection well 224 and the cool water production well 222. By increasing the distance (d) between the heated water injection well 224 and the cool water production well 222, a larger flow rate of heated water 205 can be returned to the cool water aquifer 202 for cooling without causing a significant increase in the overall temperature of the cool water aquifer 202. To maintain a substantially constant water temperature of the cool water aquifer 202 over the typical 30-year life of a binary power plant, the increase in temperature of the cool water 204 passing through the heat exchanger 210 must be minimized. To increase the efficiency of the binary power plant, the decrease in temperature of the working fluid 242 passing through the heat exchanger 210 must be maximized. In an example embodiment, the temperature increase of the cool water 204 passing through the subterranean heat exchange area 226 is maintained at about 10° C. or less.

In another exemplary embodiment, the geo-cooling system 200 may be used to cool a working fluid exiting a turbine for generating electricity in a solar thermal power plant. The working fluid entering the turbine for generating electricity in a solar thermal power plant is vaporized by the sun.

Example embodiments have been described hereinabove regarding improved geocooling methods and systems for cooling a known heat load. Various modifications to and departures from the disclosed example embodiments will occur to those having skill in the art. The subject matter that is intended to be within the spirit of this disclosure is set forth in the following claims.

What is claimed is:
1. A system comprising:
at least one cool water production well open to a cool water aquifer and in hydrologic communication with a subterranean heat exchange area that provides requisite cooling capacity to a known heat load; and
at least one heated water injection well in hydrologic communication with the subterranean heat exchange area and open to the cool water aquifer at a prescribed distance from the cool water production well, wherein the prescribed distance is based at least on the available size of the subterranean heat exchange area including a portion of the cool water aquifer that hydrologically communicates the heated water injection well with the cool water production well.

2. The system as recited in claim 1, wherein cool water produced from the cool water aquifer is used in a cooling heat exchanger to condense a vaporized working fluid exiting a turbine in a geothermal electricity generating system.

3. The system as recited in claim 2, wherein the geothermal electricity generating system is one of a flash steam power plant and a binary power plant.

4. The system as recited in claim 2, wherein the geothermal electricity generating system is a solar thermal power plant and the vaporized working fluid entering the turbine is vaporized by the sun.

5. The system as recited in claim 1, wherein cool water from the cool water aquifer is produced from a plurality of production wells and injected into the cool water aquifer through a plurality of injection wells.

6. The system as recited in claim 2, wherein the temperature of the cool water from the cool water aquifer is at least 40 degrees Celsius lower than the temperature of the working fluid entering the turbine.

7. The system as recited in claim 2, wherein the vaporized working fluid of the turbine is steam generated by vaporizing geothermally heated water.

8. The system as recited in claim 2, wherein the vaporized working fluid of the turbine is a fluid having a vaporization point lower than water and which has been vaporized in a vaporizing heat exchanger with geothermally heated water.

9. The system as recited in claim 1, wherein the system is an essentially closed fluid flow course having substantially no fluid evaporation losses therefrom.

10. The system as recited in claim 1, wherein the cool water aquifer is a porous matrix aquifer and the prescribed distance between heated water injection well and the cool water production well is determined at least by the thermal properties of a rock matrix within the cool water aquifer, the initial temperature of cool water in the cool water aquifer and the temperature of heated fluid injected into the cool water aquifer.

11. The system as recited in claim 1, wherein the cool water aquifer is a naturally fractured aquifer.

12. The system as recited in claim 1, wherein the cool water aquifer is a fractured aquifer developed through artificially stimulating a low permeability aquitard.

13. A method comprising:
providing at least one cool water production well open to a cool water aquifer and in hydrologic communication with a subterranean heat exchange area that provides requisite cooling capacity to a known heat load; and
providing at least one heated water injection well in hydrologic communication with the subterranean heat exchange area and open to the cool water aquifer at a prescribed distance from the cool water production well,
wherein the prescribed distance is based at least on the available size of the subterranean heat exchange area including a portion of the cool water aquifer that hydrologically communicates the heated water injection well with the cool water production well.

14. The method as recited in claim 13, wherein cool water produced from the cool water aquifer is used in a cooling heat exchanger to condense a vaporized working fluid exiting a turbine in a geothermal electricity generating system.

15. The method as recited in claim 14, further comprising sourcing heat used to vaporize the working fluid entering the turbine in the geothermal electricity generating system locally from a separate and warmer aquifer than the cool water aquifer.

16. The method as recited in claim 14, wherein the geothermal electricity generating system is one of a flash steam power plant, a binary power plant and a solar thermal power plant.

17. The method as recited in claim 13, wherein the cool water aquifer is a porous matrix aquifer and the prescribed distance between heated water injection well and the cool water production well is determined at least by the thermal properties of a rock matrix within the cool water aquifer, the initial temperature of cool water in the cool water aquifer and the temperature of heated fluid injected into the cool water aquifer.

18. The method as recited in claim 13, wherein the cool water aquifer is a naturally fractured aquifer.

19. The method as recited in claim 13, wherein the cool water aquifer is an artificially fractured aquifer in a low permeability aquitard developed by stimulation through injection of water under pressure.

* * * * *